Sept. 2, 1969     A. CANTARUTTI     3,464,090

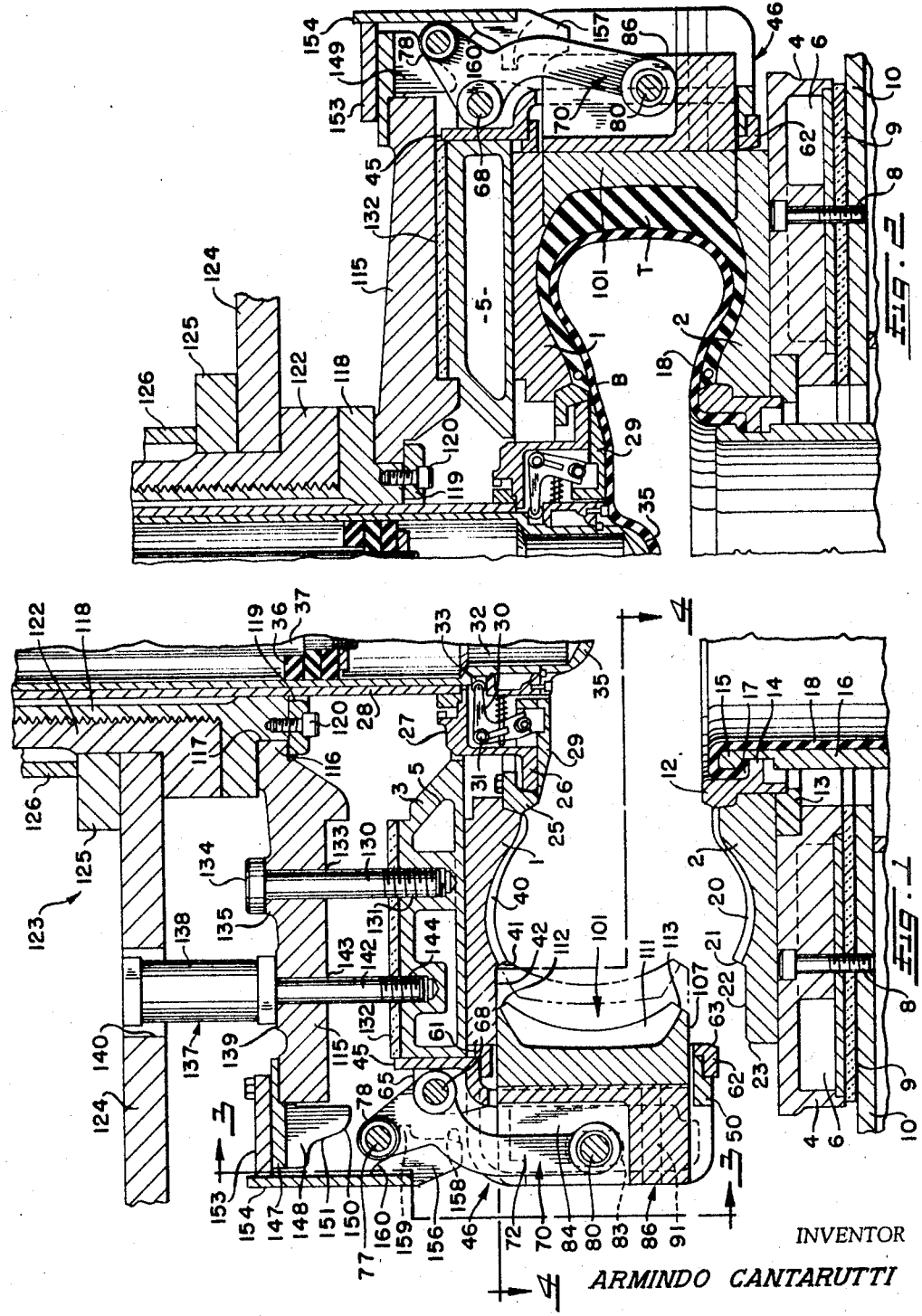

TIRE CURING PRESS

Original Filed Sept. 28, 1964     3 Sheets-Sheet 2

INVENTOR
*ARMINDO CANTARUTTI*

BY *Oberlin, Maky & Donnelly*
ATTORNEYS

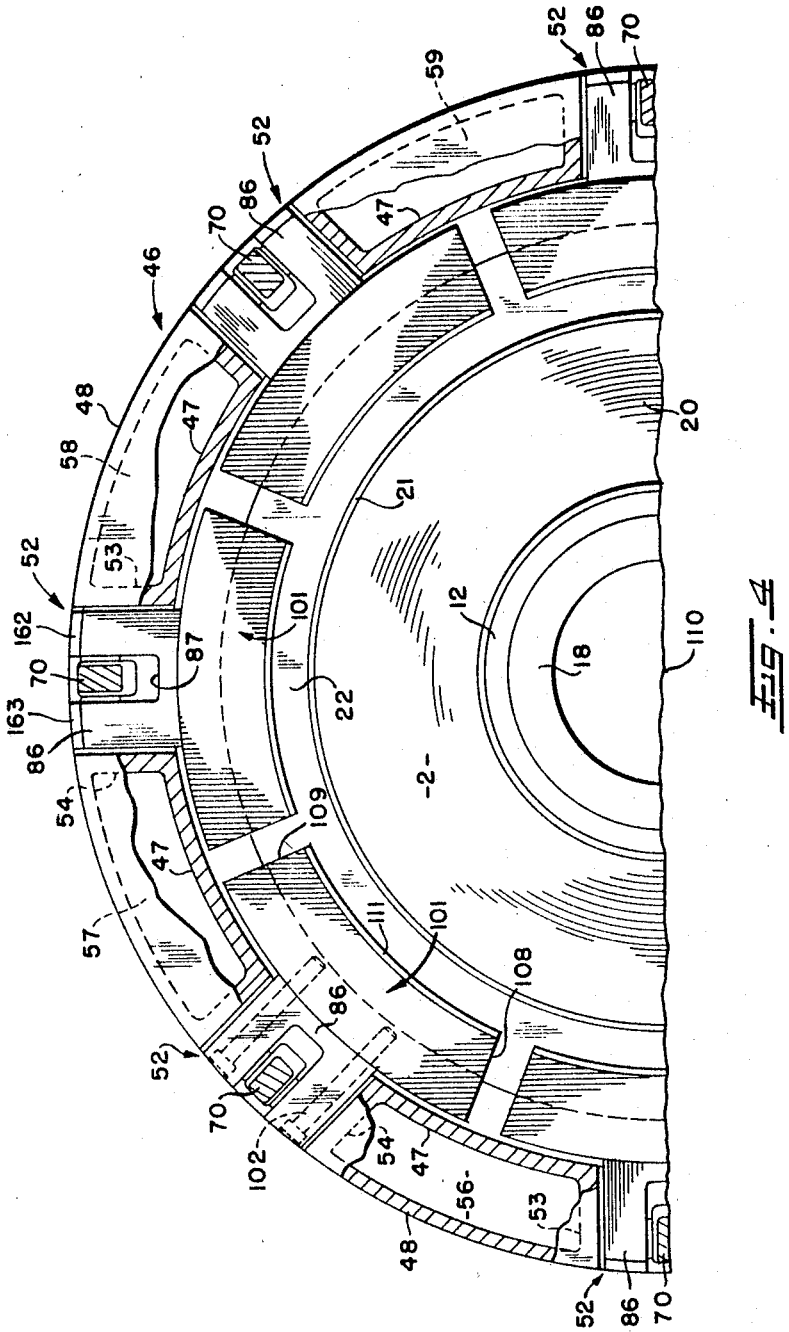

United States Patent Office 3,464,090
Patented Sept. 2, 1969

3,464,090
TIRE CURING PRESS
Armindo Cantarutti, Akron, Ohio, assignor to NRM Corporation, Akron, Ohio, a corporation of Ohio
Continuation of application Ser. No. 399,543, Sept. 28, 1964. This application Sept. 26, 1967, Ser. No. 670,805
Int. Cl. B29h 5/02, 5/4
U.S. Cl. 18—17    12 Claims

ABSTRACT OF THE DISCLOSURE

A tire curing press having radially movable mold sections operated by pivoting levers having cam followers thereon, the latter being engaged by cams upon the relative movement of the movable mold section and the supporting bolster; and further including pilot means ensuring the proper vertical and concentric registry of the sidewall mold sections prior to closing of the tread sections.

---

This is a continuation of applicant's copending application, Ser. No. 399,543 filed Sept. 28, 1964, now abandoned.

This invention relates generally as indicated to a tire curing press and more particularly to a press for curing belted, radial-cord tires.

A conventional tire is usually constructed with two or more plies of synthetic cord fabric with each ply laid at opposing angles to the next, and at about 40° to the tread circumference. A belted, radial-cord tire is usually composed of two or three carcass plies of cord fabric laid at an angle of 90° to the beads, as well as the tread circumference, and a belt of several plies is laid circumferentially beneath the tread. Steel, glass fiber, as well as the conventional synthetic materials such as rayon and nylon, have been used as the cord material for the inextensible circumferential belt. The belt, being inextensible, prevents the casing from increasing in height, when inflated, and also adds to the wearing, cornering, and high speed riding characteristics of the tire.

The inextensible belt of such radial tires presents certain vulcanizing problems in that the belt cannot readily be uniformly expanded into the tread section of a tire mold. Conventional tire presses are usually constructed with top and bottom mold halves which are vertically separable and each of which includes half of the tread section of the mold. A shaping bladder is usually employed interiorly of the tire to cause the same to conform to the mold surfaces as the press is closed and the tire is shaped. Such belted tires also create problems in the stripping of the tire from the mold sections.

It has been found that by dividing the mold into upper and lower side wall portions and a center intermediate tread portion composed of a plurality of radially movable tread sectors, that the aforementioned shaping and curing problems can largely be overcome. However, it is difficult to provide a press having a plurality of radially movable tread sectors which will joint a mold closed position in a manner to prevent flash between the sectors and also properly to register with both the upper and lower side wall mold portions. Moreover, the mold in its closed position must not only be in proper registry but also firmly locked in the closed position to withstand the high shaping and curing pressures required. In view of the massive nature of tire curing presses, the registry and locking of a mold comprised of a plurality of radially movable tread sectors presents quite a problem.

It is accordingly a principal object of the present invention to provide a tire curing press for the effective curing of belted, radial-cord tires.

Another principal object is the provision of a tire curing press which includes a plurality of radially movable tread mold sectors which will automatically be brought into proper registry with the upper and lower side wall sections of the mold as the press is closed.

Another object of the present invention is the provision of a tire curing press for such radial tires having ensured concentricity between the upper and lower mold sections as well as the radially movable tread sectors in the closed position.

Yet another object is the provision of a tire curing press for such tires wherein the mold closes with the tread sectors of the mold in an out position and the continued closing of the press causes such sectors to move inwardly confining the tread portion of the tire.

A yet further object is the provision of a tire press for curing such radial tires wherein continued use of the tread sector operating mechanism will not affect the registry or concentricity of the mold parts in the mold closed position.

Still another object is the provision of a tire curing press as set forth above wherein the tread sector portions of the mold are moved radially by relative movement between the top platen and its supporting bolster plate.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a fragmentary vertical section of a press in accordance with the present invention illustrating the press head partially closed with the tread sectors of the mold in their retracted position;

FIG. 2 is a similar fragmentary section illustrating the press in its closed position;

FIG. 4 is a fragmentary horizontal section taken substantially on the line 4—4 of FIG. 1.

Figure 3:
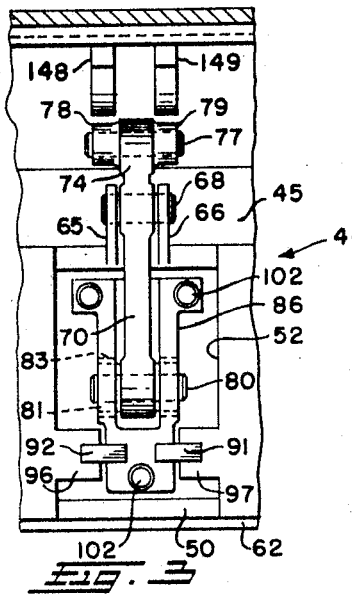
FIG. 3 is a fragmentary vetrical section taken substantially on the line 3—3 of FIG. 1.

Referring now to the annexed drawings and more particularly to FIG. 1, there is illustrated in vertical section the mold assembly of a press in accordance with the present invention. The mold assembly includes an anaular upper side wall mold 1 and an opposed annular lower side wall mold 2 mounted on annular top and bottom platens 3 and 4, respectively. Such platens include chambers therein as indicated at 5 and 6, respectively, for the circulation of a heating medium there-through such as steam. The bottom platen 4 is secured, by suitable fasteners, 8, through an annular insulating plate 9 to the base 10 of the press.

The interior of the lower side wall mold 2 is provided with an upstanding toe ring 12 mounted on the shoulder of ring 13 and includes an inwardly directed flange 14 cooperating with the upper beaded edge 15 of well 16 to form an annular receptacle for the bead 17 of a forming bladder 18. The bladder 18 in its retracted position is normally withdrawn or invaginated into the well 16 as illustrated in FIG. 1.

The lower side wall mold 2 includes a mold surface 20 which extends from the toe ring 12 to an annular frusto-conical step 21. Beyond such step, the lower side wall mold 2 is provided with a flat horizontal surface 22 which terminates in a rounded corner 23 at the outer end of the lower side wall mold 2.

The upper side wall mold 1 inwardly terminates in an upper toe ring 25 which is mounted on the flange 26 of housing 27 secured to vertically extending tubular member 28. The vertical movement of the tubular member 28 will thus move the toe ring 25 vertically away from the upper side wall mold 1.

Directly beneath the upper toe ring 25 and the flange 26 there is provided a plurality of radially movable chuck plate segments 29, such movement being obtained by bell cranks 30 which are pivoted about their intermediate fixed pivots 31 by vertical movement of the bladder ram 32. The bladder ram 32 includes a groove 33 which engages the inwardly projecting arm of the bell crank 30 to pivot the same in a clockwise direction as viewed in FIG. 1 as the bladder ram 32 descends. The bladder ram 32 includes a lower ball nose 35 which is operative to cooperate with a reinforced recess portion in the bladder 18 so that vertical movement of the bladder ram will strip the bladder from the cured tire and place the same in the invaginated condition within the well 16 shown in FIG. 1. Vertical movement of the ram 32 may be obtained pneumatically and a fixed piston 36 mounted on rod 37 is provided within the ram for such movement. Reference may be had to U.S. Patent No. 3,097,394 to E. E. Mallory et al. for a more clear disclosure of such a bladder ram and chuck mechanism.

The upper side wall mold 1 includes a mold surface 40 which extends from the toe ring 25 radially outwardly to a frusto-conical step 41 vis-a-vis the step 21 in the lower side wall mold 2. Beyond the step 41 the upper side wall mold is provided with a horizontal planar surface 42.

Figure 5:
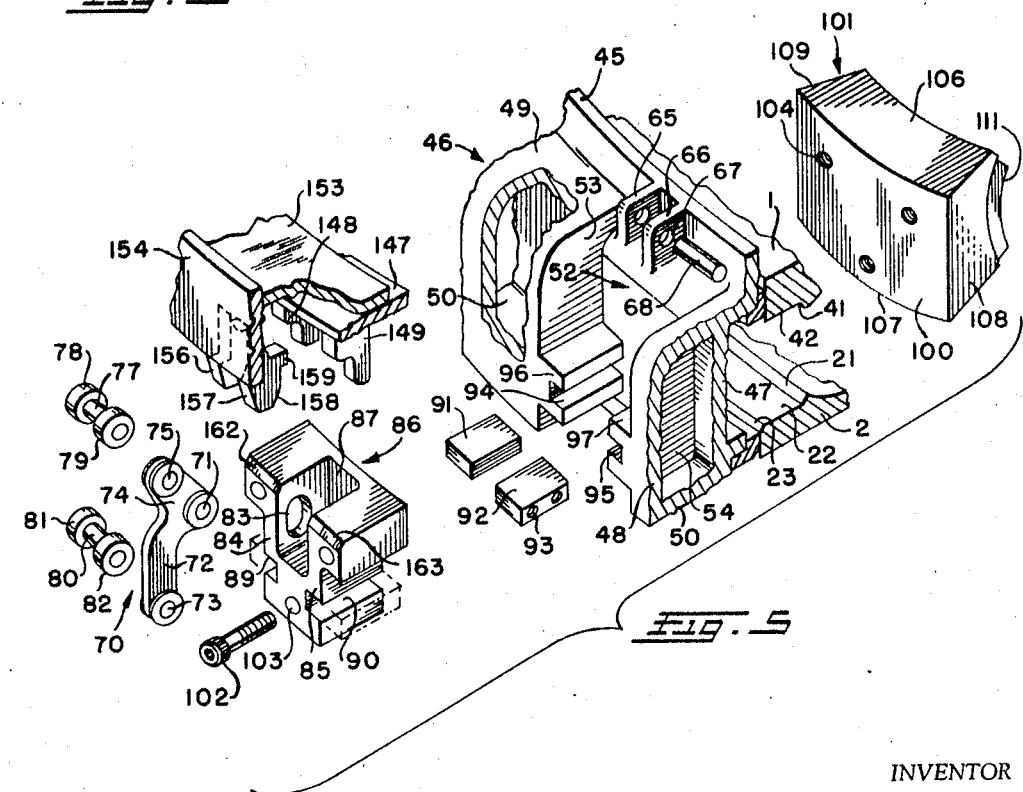
FIG. 5 is a fragmentary exploded view illustrating the construction of the tread mold sector and its operating linkage.

Secured to the outer end of the platen 3 is the upstanding flange 45 of annular housing 46, the configuration of which is perhaps more clearly shown in FIG. 5. In addition to the flange 45, the housing 46 includes an interior vertical wall 47, an exterior vertical wall 48 and top and bottom walls 49 and 50, respectively. The flange 45 extends upwardly from the top wall 49 and is inwardly offset from the interior vertical wall 47.

This wall construction of the housing 46 is not continuous circumferentially thereof but is interrupted by a plurality of windows 52. The vertical walls 47 and 48 are interrupted by such windows and the chambers formed therebetween may be closed at such windows by vertical end walls 53 and 54 on opposite sides of the openings 52. However, the top and bottom walls 49 and 50, interiorly of the vertical wall 47 may be continuous circumferentially of the housing 46.

The discontinuous wall configuration provided by the windows 52 affords a plurality of steam chambers intermediate such windows as indicated more clearly in FIG. 4 at 56, 57, 58 and 59. As can be determined from FIG. 4, the housing 46, which surrounds the mold, is provided with a total of eight such steam chambers interposed between eight such windows 52. It will, of course, be appreciated that the housing 46 may be constructed with greater or fewer windows but for the purposes of the present invention, the illustrated embodiment has been found to be a practical minimum.

At the inner end of the upper wall 49 shouldered at the lower end of the upstanding flange 45, there is provided an upper registry ring 61 positioned between the exterior of the upper side wall mold 1 and the housing 46. There is also provided a lower registry ring 62 shouldered on the interior lower edge of the continuous interior portion of the lower wall 50 and the interior lower surface of such ring is provided with a slightly downwardly flaring pilot surface 63. Such surface will cooperate with the upper rounded edge 23 of the lower side wall mold 2 upon vertical movement of the housing 46 with the steam platen 3.

Referring now more particularly to FIGS. 1, 3, 4 and 5, and initially to FIG. 5, it will be seen that the top wall 49 of the housing 46 is provided with two upstanding ears 65 and 66 which extend from the wall to the upstanding flange 45 and the pair of ears are generally centered with respect to the opening 52. Each of the ears 65 and 66 is provided with an aperture as indicated at 67, such being aligned axially and such apertures accommodate pin 68 which is utilized pivotally to connect link 70 to the housing 46 between the ears 65 and 66. The pin 68 extends through the radially inwardly offset middle aperture 71 in the link 70 which includes a downwardly extending arm 72 which terminates in aperture 73 and an upwardly extending rearwardly inclined somewhat shorter arm 74 terminating in an aperture 75. A pin 77 having hardened bushings or cam followers 78 and 79 on each end thereof, in its assembled condition, is fitted within the upper aperture 75 of the link 70. A similar pin 80 having hardened wear bushings 81 and 82 on each end thereof is fitted in the lower aperture 73.

The bushings 81 and 82 in the assembled condition of the pin 80 with the link 70 fit within vertically elongated slots 83 in the side walls 84 and 85 of yoke block 86. Such side walls are formed by the recess or slot 87 in such block. The lower portion of the block is provided with two horizontal slots 89 and 90 which receive horizontally extending tongues 91 and 92, respectively, which in the assembled condition with the block 86 project substantially laterally thereof. Such tongues may be secured within the slots by suitable fasteners positioned within the apertures indicated at 93 in FIG. 5.

The tongues 91 and 92 are adapted to be slidably received in horizontal slots 94 and 95, respectively, in inwardly directed U-shape guides 96 and 97 secured to the inside of the vertically extending walls 53 and 54 of the housing 46 adjacent each window opening 52 near the lower end thereof. The inner face of the block 86 is slightly curved and is adapted to mate with the outer face 100 of tread mold sector 101. The sector 101 is secured to the block 86 by suitable fasteners 102 extending through apertures 103 in the block 86 and threaded into the tapped apertures 104 in the sector 101. In the illustrated embodiment, three such fasteners may be employed to secure the block 86 to the sector 101.

As seen in FIG. 4, there will be one such tread sector for each window 52 or eight in number for the illustrated mold. Each tread sector 101 includes horizontal parallel planar top and bottom surfaces 106 and 107, respectively, and side wall surfaces 108 and 109 which extend radially from the center of the mold indicated at 110 in FIG. 4 in the closed position of the tread sectors. The interior surface of the sector includes the tread mold pattern as indicated at 111 and the center of such arcuate surface will also be the center of the mold 110 in the closed position of the sectors. The top and bottom edges of the interior mold surface 111 of each of the sectors is provided with an arcuate frustoconical seat as indicated at 112 and 113 and such surfaces cooperate with the frustoconical seats 41 and 21 of the upper side wall mold 1 and the lower side wall mold 2, respectively, in the closed position of the tread sectors.

It can now be seen that the tread sectors 101, eight in number in the illustrated embodiment, are mounted for movement radially of the center 110 of the mold. Such radial movement is obtained by relative vertical movement of annular bolster plate 115 and the piston 3. The bolster plate 115 includes an inwardly directed annular flange 116 fitted in shoulder 117 of adjusting screw 118 and held therein by ring 119 secured to the bottom of the screw by fasteners 120. The screw 118 is threadedly engaged with nut 122 which is in turn secured to the box section fabricated beam 123 of the press head. Such beam includes a bottom plate 124, a ring 125, and an upstanding reinforcing member 126 surrounding the nut 122. Reference may be had to Brundage Patent No. 2,778,060, as well as the aforementioned Mallory et al. Patent No. 3,097,394 for illustrations of such press head construction. It will be appreciated that the present invention can be employed with any type press wherein the press head moves vertically to carry the top mold section for opening and closing of the press. Such opening and closing is usually obtained by large bull gears at the sides of the press connected by links to the head or beam moving the same in vertical slots in side cams. It is also preferred, although not necessary, that the press be of the type shown in the aforementioned Mallory et al. patent wherein the head also moves laterally when vertically opened to clear the lower toe ring for overhead loading of the tire carcass and to facilitate discharge of the cured tire from the press. Such presses are widely employed in the tire industry and are known as Autoform Slide-Back presses manufactured by NRM Corporation of Akron, Ohio.

The platen 3 is supported by the bolster 115 by means of a plurality of studs 130 which extend freely through the bolster plate and are threaded as indicated at 131 into the platen 3. The studs also extend through apertures in insulating plate 132 provided on the top of the platen 3 and, of course, through apertures 133 in the bolster plate slightly larger in diameter than the O.D. of the stud shank. Such studs are provided with heads 134 which seat on the flattened upstanding buttons 135 on the top surface of the bolster.

The platen 3 and bolster 115 are also interconnected by a plurality of air springs indicated generally at 137. Such air springs include piston-cylinder assemblies 138 which are mounted on buttons 139 on the top of the bolster 115 and such may extend through clearance apertures 140 in the bottom beam plate 124. Connected to the piston of the assembly 138 is rod 142 which extends freely through aperture 143 in the bolster and the distal end thereof is threaded into the platen 3 as indicated at 144. Such rod also extends through an aperture in the insulating plate 132. The air spring 137 will have air pressure supplied to the blind end thereof biasing the rod 142 to an extended position thus biasing the platen 3 to a position separated from the bolster 115 as seen in FIG. 1.

Shouldered on the upper outer corner of the bolster 115 is a plate 147 which extends substantially beyond the bolster and from the overhanging portion of which project dependingly paired cams 148 and 149. As seen perhaps more clearly in FIGS. 1 and 2, the lower outer edges of each cam includes a sector moving surface 150 contiguous with a sector locking surface 151 effective to engage the hardened bushings 78 and 79 on the ends of the pin 77 positioned in the upper aperture 75 of the links or levers 70. It will, of course, be understood that there will be a pair of such cams 148 and 149 for each lever 70 positioned circumferentially of the mold.

Also secured to the outer end of the bolster 115 is an annular plate 153 positioned above and adjacent the plate 147 and the outer end thereof is affixed to a cylindrical depending annular frame member 154. As seen more clearly in FIG. 5, shouldered on the lower inner edge of the cylindrical frame 154 are lugs 156 and 157, paired for each of the levers 70, and straddling the same in the same manner as the cams 148 and 149. There will, of course, be a pair of such lugs for each of the levers 70 positioned circumferentially of the mold. Each of the lugs includes a depending portion having a lower inner pilot surface 158 which extends from the lower end of the lug upwardly and inwardly. Each lug also includes an inwardly projecting shoulder 159, the top surface of which includes an upwardly and outwardly extending cam 160. Such cam surfaces are arranged to engage the bushings 78 and 79 on the pin 77 at the upper end of the lever 70. The pilot surface 158 on the lugs 156 and 157 is operative to engage the upper outer rounded edges 162 and 163, respectively, of the yoke blocks 86.

The operation of the press is now believed apparent. The press head which includes the beam 123 will be moved upwardly and preferably laterally to clear the lower side wall mold 2 for overhead loading of the green tire or carcass. Green tires of the belted, radial-cord type are generally made partially preformed or in a C-shape and an overhead loader may be employed with the press opened to position the green tire with the lower bead thereof in registry with the bottom toe ring 12. The diaphragm 18 may then be expanded into the green tire to hold the same in place and the press will now be closed with the beam 123 descending carrying therewith the bolster 115 and the platen 3 vertically spaced therebeneath due to the bias of the air springs 137 holding the heads 134 of the studs 130 against the top of the bolster. In such position, the tread sectors 101 will be in their radially retracted positions and will clear the tread section of the green tire as the beam descends.

Initially, the lower registry ring 62 and its inner pilot surface 63 will engage the outer edge or corner 23 of the lower side wall mold 2 centering the upper side wall mold with respect to the lower side wall mold. The beam 123 continues to descend until the undersurface 107 of the tread sectors 101 engages the planar horizontal surface 22 of the lower side wall mold 2. In this position, the toe rings 12 and 25 will then be vertically spaced as in FIG. 2 in the proper position for curing the tire. The tread sectors 101 will, however, still be in their radially retracted position. Such sectors will then have moved to a position horizontally surrounding the tread portion of the green tire without yet having engaged the same.

Continued vertical movement of the beam 123 now causes the bolster 115 to move downwardly with respect to the platen 3, the latter being now centered and seated with respect to the lower side wall mold 2 with the upper and lower surfaces of the tread sectors contacting the horizontal planar outer surfaces of both the upper and lower side wall molds. As the beam descends, the rods 142 of the air springs 137 will be moved upwardly moving the pistons within the cylinder assemblies 138 compressing the air therewithin and such downward biasing of the platen 3 maintains the upper and lower side wall molds in proper surface contact with the tread sectors. Further downward movement of the bolster 115 causes the cams 148 and 149 to engage the bushings or cam followers 78 and 79 on the pins 77 pivoting or rocking the lever 70 in a counterclockwise direction about the pivot pin 68 as viewed in FIG. 1 now causing the tread sectors 101 to move radially inwardly in the illustrated embodiment, approximately ¾ of an inch of relative vertical movement between the platen 3 and the bolster 115 is sufficient to move the sectors radially inwardly, and about 1 inch of further vertical movement then causes the interior flaring or pilot surfaces 158 of the lugs 156 and 157 to engage the back edges of the yoke blocks 86 to register the sectors and lock the same in place. The sectors will then be held in place by such lugs and additionally by the surface 151 of the cams 148 and 149. Accordingly, any play or wear in the pins 68, 80 or 77 will be inconsequential in the seating of the tread sectors 101 against the frustoconical surfaces 21 and 41 of the lower and upper side wall molds due to the final registry of such sectors by the pilot surfaces 158 on the interior of the depending lugs. In this manner, considerable play can be tolerated in the link mechanism without affecting the ability of the tread sectors properly to close about the tread portion of the green tire to form when closed the annular tread portion of the mold. It will, of course, be appreciated that the cams 148 and 149 may be radially adjusted with respect to the bolster 115 by any suitable mechanism such as jack screws to ensure proper seating and registry of the mold sectors during continuous constant use of the press.

When the curing of the tire T as seen in FIG. 2 is complete, the bladder ram 32 will be driven downwardly causing the nose 35 thereof to invaginate the bladder 18 placing the same within the well 16 and stripping the bladder from the tire T. The vertical movement of the ram will cause the bell cranks 30 to move the chuck plates 29 radially outwardly so that the tips thereof will extend beneath the upper bead B of the tire. The press may now start to open with the beam 123 moving upwardly carrying therewith the bolster 115. However, the platen 3 will initially remain in the position shown in FIG. 2 due to the biasing action of the air springs 137. Upward movement of the bolster 115 removes the cams 148 and 149 from engagement with the bushings 78 and 79 and further upward movement causes the shoulders 159 of the lugs 156 and 157 to engage the underside of such bushings pivoting the levers 70 in a clockwise direction as viewed in FIG. 1 causing the same to retract the tread sectors 100 stripping such from the tread portion of the tire. In the retracted position of the tread sectors, the same will be completely clear of the periphery of the cured tire and continued upward movement of the bolster 115 causes the heads 134 of the studs 130 to seat on the top of the bolster now moving upwardly the platen 3 and the upper side wall mold section carried thereby as well as the annular housing 46 carrying the retracted tread sectors. The position of the chuck plates 29 beneath the upper bead B of the tire ensures that the tire will be carried upwardly with the upper side wall mold 1 and accordingly be stripped from the lower side wall mold 2.

After the beam 123 has moved upwardly and laterally again to clear the bottom toe ring 12 for overhead loading of the next green tire, the cylindrical tube 28 may now be moved downwardly causing the upper toe ring 25 to move away from the upper side wall mold 1 stripping the cured tire therefrom. The chuck plates 29 may now be retracted by retraction of the bladder ram 32 and the tire may then drop onto a discharge conveyor.

It will, of course, be appreciated that the housing 46 carrying the links 70 and the retractible tread segments 101 may be carried by the bottom platen 4 with cams supported by the bolster 115 still moving the links 70 about the pivots 68 upon relative vertical movement between the bolster and the top platen 3. Also, it will be understood that the illustrated mechanism may be inverted so that the tread sectors may be operated by relative movement of the lower platen 4 with respect to the base 10. In any event, there is provided a tire curing press for curing belted, radial-cord tires wherein the upper assembly includes a registry surface 63 which engages the corner 23 of the lower side wall mold 2 ensuring concentricity between the assembly and such mold. As the press further closes, the cams operate the levers to move the tread sectors inwardly into curing position. After having been moved thus inwardly, the pilot surfaces 156 on each of the lugs engages the outer edge of the yoke blocks registering the sectors ensuring concentricity thereof and proper seating engagement between the frustoconical surfaces 112 and 41, and 113 and 21 respectively.

It can now be seen that the inextensible belt of the tire cured will not affect the shaping and curing as well as the stripping of the tire from the mold due to the contraction of the tread sectors about the tread of the tire confining the tread portion and extensible belt therebeneath.

Other modes of applying the principle of the invention may be employed, change being made as regards the details described, provided the features stated in any of the following claims or the equivalent of such be employed.

I, therefore, particularly point out and distinctly claim as my invention:

1. A tire press for curing belted, radial-cord tires and the like comprising a stationary lower side wall mold section, a vertically movable upper side wall mold section, a bolster supporting said upper side wall mold section for such vertical movement, means operative vertically to move said bolster, means mounting said bolster and upper side wall mold section for relative vertical movement, a tread mold section comprising a plurality of radially movable tread sectors which when moved radially inwardly seat against said upper and lower side wall mold sections to form a continuous tread mold section therebetween, means operative to register said upper and lower side wall mold sections on vertical downward movement of said upper side wall mold section, means responsive to vertically downward movement of said bolster with respect to said upper side wall mold section operative to move said sectors radially inwardly, and means responsive to the movement of said bolster upwardly with respect to said upper side wall mold section operative to move said movable sectors radially outwardly.

2. A tire press as set forth in claim 1 wherein said means to more said sectors radially inwardly includes lever means operatively connected to said tread sectors, and cam means on said bolster operative to engage said lever means when said bolster and upper side wall mold section are relatively vertically moved and to move radially said tread sectors.

3. A tire press as set forth in claim 1 wherein said means mounting said bolster and upper side wall mold section for relative vertical movement is operative to bias said bolster and upper side wall mold section apart.

4. A tire press as set forth in claim 1 including means operative to register and lock said tread sectors in seating engagement with said upper and lower side wall mold sections on relative vertical movement of said bolster and upper side wall mold section.

5. A tire press as set forth in claim 1 wherein said upper side wall mold section includes a top platen secured thereto, an annular housing peripherally secured to and depending from said top platen, a plurality of windows in said housing, means mounting said tread sectors for horizontal movement within said windows, and pivoted link means interconnecting said tread sectors and said housing.

6. A tire press as set forth in claim 5 wherein each link means includes a projecting arm, cam follower means on said arm, cam means on said bolster operative to engage said cam follower means whereby relative vertical movement of said bolster and upper side wall mold section will pivot said link means thus radially moving said treat sectors.

7. A tire press as set forth in claim 5 wherein each link means includes a projecting arm, cam follower means on said arm, said means to move said sectors inwardly includes a first cam means operative to pivot said link means inwardly on vertical downward movement of said bolster with respect to said upper said wall mold section, and said means to move said sectors outwardly includes a second cam means operative to pivot said link means outwardly during opposite relative movement of the bolster and upper side wall mold section.

8. A tire curing press including an upper side wall mold, a lower side wall mold, an expansible tread mold peripherally therebetween, means for opening and closing said upper and lower side wall molds, a vertically movable bolster supporting said upper side wall mold for vertical movement, means interconnecting said bolster and upper side wall mold for relative vertical movement, means responsive to the closing of said upper and lower side wall molds to position properly said upper and lower side wall molds both vertically and concentrically with respect to each other, said expansible tread mold including a plurality of radially movable sectors, pivoted lever means interconnecting each sector and one of said side wall molds, means responsive subsequent to the closing of said upper and lower side wall molds to effect relative vertical movement of said bolster with respect to said upper side wall mold to pivot said lever means and thereby radially move said sectors for contracting said tread mold to form with said side wall molds a complete tire curing mold, and means responsive prior to the opening of said upper and lower side wall molds to pivot said lever means to expand said tread mold.

9. A tire curing press as set forth in claim 1 wherein each lever means is pivotally connected to said upper side wall mold, and said means to pivot said lever means includes cam means on said bolster operative to engage each lever means to swing the same during such relative movement of said bolster and upper side wall mold.

10. A tire curing press as set forth in claim 9 wherein each lever means includes a relatively short arm, and cam follower means on each said arm operative to engage said cam means on said bolster.

11. A tire curing press as set forth in claim 10 including an annular housing mounted on said upper side wall mold section, a plurality of windows in said housing, and guide means in said windows supporting said sectors for radial movement, and said means to register said upper and lower side wall sections comprises pilot means on said housing operative to engage said lower side wall mold section to center the upper side wall mold section with respect thereto.

12. A tire curing press as set forth in claim 11 including other pilot means on said bolster operative to engage said sectors properly to seat and lock the same in concentric contracted position against said upper and lower side wall mold sections.

References Cited

UNITED STATES PATENTS

| | | | |
|---|---|---|---|
| 1,179,898 | 4/1916 | Coffey et al. | 18—17 |
| 1,388,255 | 8/1921 | Hardeman | 18—17 |
| 2,567,985 | 9/1951 | Baker et al. | 18—18 |
| 3,097,394 | 7/1963 | Mallory et al. | 18—27 X |
| 3,337,918 | 8/1967 | Pacciarini et al. | 18—17 |
| 3,358,330 | 12/1967 | Pacciarini et al. | 18—17 |

FOREIGN PATENTS

| | | |
|---|---|---|
| Ad. 235 | 1/1912 | Great Britain. |
| Ad. 235 | 2/1912 | Great Britain. |

J. HOWARD FLINT, JR., Primary Examiner

U.S. Cl. X.R.

264—315, 326